(12) United States Patent
Song et al.

(10) Patent No.: US 10,943,478 B2
(45) Date of Patent: Mar. 9, 2021

(54) TRAFFIC CONTROL METHOD, AND APPARATUS

(71) Applicant: HUAWEI TECHNOLOGIES CO., LTD., Guangdong (CN)

(72) Inventors: Yonggang Song, Beijing (CN); Xiangjiang Qian, Shenzhen (CN); Hui Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 235 days.

(21) Appl. No.: 16/111,588

(22) Filed: Aug. 24, 2018

(65) Prior Publication Data
US 2018/0365994 A1   Dec. 20, 2018

Related U.S. Application Data

(63) Continuation of application No. PCT/CN2016/074711, filed on Feb. 26, 2016.

(51) Int. Cl.
*G08G 1/0967*   (2006.01)
*G08G 1/01*   (2006.01)
(Continued)

(52) U.S. Cl.
CPC ....... *G08G 1/096775* (2013.01); *G01C 21/32* (2013.01); *G05D 1/0223* (2013.01);
(Continued)

(58) Field of Classification Search
None
See application file for complete search history.

(56) References Cited

U.S. PATENT DOCUMENTS 9,547,986 B1 * 1/2017 Curlander ............... G08G 1/04
2004/0091313 A1   5/2004 Zhou
(Continued)

FOREIGN PATENT DOCUMENTS

CN   102157071 A   8/2011
CN   102194314 A   9/2011
(Continued)

OTHER PUBLICATIONS

Office Action issued in Chinese Application No. 201680063838.2 dated Dec. 17, 2019, 15 pages.
(Continued)

*Primary Examiner* — Todd Melton
(74) *Attorney, Agent, or Firm* — Fish & Richardson P.C.

(57) ABSTRACT

Embodiments of the present invention provide a traffic control method and an apparatus. The method includes: obtaining, by a server, a traffic flow of a road; adjusting, by the server, a lane quantity or a lane width of the road at a lane layer on a map according to the traffic flow of the road; and sending, by the server, a lane layer obtained after the adjustment, so that a vehicle running on the road runs according to a lane obtained after the adjustment. In the embodiments of the present invention, the traffic flow of the road is obtained, and the lane quantity or the lane width of the road is adjusted at the lane layer on the map according to the traffic flow of the road, so that the vehicle running on the road can run according to the lane obtained after the adjustment.

18 Claims, 6 Drawing Sheets

(51) Int. Cl.
*G01C 21/32* (2006.01)
*G08G 1/0968* (2006.01)
*G05D 1/02* (2020.01)

(52) U.S. Cl.
CPC ......... *G08G 1/0108* (2013.01); *G08G 1/0112* (2013.01); *G08G 1/0145* (2013.01); *G08G 1/0968* (2013.01)

(56) References Cited

U.S. PATENT DOCUMENTS

| | | |
|---|---|---|
| 2004/0158366 A1 | 8/2004 | Dieterle |
| 2009/0125160 A1 | 5/2009 | Desai et al. |
| 2013/0275033 A1 | 10/2013 | Bastiaensen et al. |

FOREIGN PATENT DOCUMENTS

| | | |
|---|---|---|
| CN | 102568222 A | 7/2012 |
| CN | 103177596 A | 6/2013 |
| CN | 103471596 A | 12/2013 |
| CN | 103559009 A | 2/2014 |
| CN | 104658283 A | 5/2015 |
| CN | 104658284 A | 5/2015 |
| EP | 1485897 A1 | 12/2004 |

OTHER PUBLICATIONS 201680063838.2Search Report issued in Chinese Application No. 201680063838.2 dated Dec. 9, 2019, 3 pages.

Ma Yingying et al, Association analysis of urban road free-flow speed and lane width. Journal of Tongji university (Natural science), vol. 37, No. 12, Dec. 2009, 6 pages.

International Search Report issued in International Application No. PCT/CN2016/074711 dated Jul. 6, 2016, 12 pages.

Wang Jin et al:"Autonomous Driving Using Inertial Aided KGPS and Vision System Based on Precision Maps", GPS 2001—Proceedings of the 14th International Technical Meeting of the Satellite Division of the Institute of Navigation(ION GPS 2001), Sep. 14, 2001, pp. 2612-2617, XP056009024.

Rafa El Toledo-Moreo et al:"Integrity provision for map-matched positioning of road vehicles at lane level", Intelligent Transportation Systems, 2009. ITSC'09.12th International IEEE Conference on, Oct. 4, 2009, pp. 1-6, XP031560077.

Matthew Hausknecht et al:"Dynamic lane reversal in traffic management", Intelligent Transportation Systems(ITSC), 2011 14th International IEEE Conference on, IEEE, Oct. 5, 2011, pp. 1929-1934, XP032023327.

Extended European Search Report issued in European Application No. 16891045.3 dated Feb. 1, 2019, 10 pages.

* cited by examiner

TRAFFIC CONTROL METHOD, AND APPARATUS

CROSS-REFERENCE TO RELATED APPLICATIONS

This application is a continuation of International Application No. PCT/CN2016/074711, filed on Feb. 26, 2016. The disclosures of the aforementioned applications are hereby incorporated by reference in their entireties.

TECHNICAL FIELD

The present invention relates to the field of intelligent transportation technologies, and in particular, to a traffic control method and an apparatus.

BACKGROUND

Currently, major map manufacturers all start to develop high-precision maps, and one crucial thing is to improve road precision to a lane level. Currently, to obtain each lane-level high-precision map, a collection vehicle or another collection device collects lane information on actual roads, and a lane division status is added to the map. Lane division on the map remains consistent with lane division on the actual roads. Because currently a lane quantity and a lane width of a road on a map are fixed, a lane on which a vehicle runs cannot be dynamically adjusted according to information such as a traffic flow of the road.

SUMMARY

Embodiments of the present invention provide a traffic control method and an apparatus, so as to control a vehicle to dynamically adjust a lane for running.

According to a first aspect, a traffic control method is provided. The method includes: obtaining, by a server, a traffic flow of a road; adjusting, by the server, a lane quantity or a lane width of the road at a lane layer on a map according to the traffic flow of the road; and sending, by the server, a lane layer obtained after the adjustment, so that a vehicle running on the road runs according to a lane obtained after the adjustment.

The map used in the method includes a dynamic lane layer.

The method may be applied to a network control-based intelligent three-tier transport architecture. The intelligent three-tier transport architecture includes a central serving apparatus, a roadside apparatus, and an in-vehicle apparatus. The in-vehicle apparatus may separately communicate with the roadside apparatus and the central serving apparatus, or the in-vehicle apparatus may communicate with the central serving apparatus by using the roadside apparatus.

The server may be the central serving apparatus or the roadside apparatus in the network control-based intelligent three-tier transport architecture.

Alternatively, the server may be a device having functions of both the central serving apparatus and the roadside apparatus.

The sending, by the server, a lane layer obtained after the adjustment includes: sending, by the server, the lane layer obtained after the adjustment to the vehicle running on the road.

Optionally, the sending, by the server, a lane layer obtained after the adjustment includes: sending, by the server, the lane layer obtained after the adjustment to the roadside apparatus.

The traffic flow of the road is obtained, and the lane of the road is adjusted at the lane layer on the map according to the traffic flow of the road, so that the vehicle running on the road can run according to the lane obtained after the adjustment. In this way, a precise lane on which the vehicle runs can be dynamically planned and controlled according to the traffic flow.

Optionally, the method may further include: receiving, by the server, locations that are respectively reported by multiple in-vehicle apparatuses and that are of vehicles on which the multiple in-vehicle apparatuses are respectively located; and the obtaining, by a server, a traffic flow of a road includes: determining, by the server, the traffic flow of the road according to the locations of the multiple vehicles. In this way, the server may collect statistics according to the locations that are reported by the in-vehicle apparatuses and that are of the vehicles, to determine the traffic flow of the road.

Optionally, the server may further obtain the traffic flow of the road from a traffic monitoring system. Specifically, the traffic monitoring system may detect the traffic flow of the road by using a video detection technology, or the like. However, this is not limited in this embodiment of the present invention. The server may further obtain the traffic flow of the road in another manner.

With reference to the first aspect, in a first possible implementation of the first aspect, the method further includes: receiving, by the server, a location of the vehicle that is reported by an in-vehicle apparatus of the vehicle running on the road; replanning, by the server according to the lane obtained after the adjustment and the location of the vehicle, a lane on which the vehicle runs, and determining path change information; and sending, by the server, the path change information to the in-vehicle apparatus, where the path change information is used to instruct the vehicle to run, according to the lane obtained after the adjustment, on a target lane obtained after the replanning.

With reference to the first aspect or the first possible implementation of the first aspect, in a second possible implementation of the first aspect, the method further includes: receiving, by the server, an identifier that is of a first vehicle running on the road and that is reported by a first in-vehicle apparatus; and determining, by the server, an attribute of the first vehicle according to the identifier of the first vehicle; and the adjusting a lane width of the road at a lane layer according to the traffic flow of the road includes: when the attribute of the first vehicle satisfies a preset condition, increasing, at the lane layer, a width of a lane on which the first vehicle is located and decreasing a width of another lane on the road.

For example, the attribute of the vehicle may be used to distinguish a function or use of the vehicle. For example, the attribute of the vehicle may include: a private car, public transportation, vehicles for performing special tasks (emergency vehicles such as police cars, firefighting trucks, and ambulances), or the like. However, this embodiment of the present invention is not limited thereto. The attribute of the vehicle may further include an attribute described from another perspective, for example, a width of the vehicle or an optimal running speed of the vehicle.

Optionally, when a width of a lane on which the vehicle is located is adjusted according to the attribute of the vehicle, the traffic flow of the road may be further considered. For example, the adjusting a lane width of the road at a lane layer according to the traffic flow of the road includes: when the traffic flow of the road is less than a preset flow, and the attribute of the vehicle satisfies a preset condition, increasing, by the server at the lane layer, a width of the lane on which the vehicle is located, and decreasing a width of another lane on the road.

A width of a lane on which a special vehicle is located is dynamically increased according to the attribute of the vehicle, so that an unimpeded running speed of the special vehicle can be increased, ensuring that the special vehicle can pass rapidly.

With reference to the first aspect or the first possible implementation of the first aspect, in a third possible implementation of the first aspect, the method further includes: receiving, by the server, a running speed that is of a first vehicle running on the road and that is reported by a first in-vehicle apparatus; and the adjusting, by the server, a lane quantity of the road at a lane layer according to the traffic flow of the road includes: when the traffic flow of the road decreases, a difference between the running speed of the first vehicle and a first preset speed is less than a preset threshold, and a quantity N of lanes on the road is greater than a first preset value $N_{min}$, redividing, by the server at the lane layer, the road into M lanes, where $N_{min} \leq M < N$.

The first preset value $N_{min}$ may be a minimum value of a quantity of lanes that are allowed to be divided on the road.

A width of a lane can be increased by decreasing a quantity of lanes, so that a user's driving experience can be improved.

With reference to the second or the third possible implementation of the first aspect, in a fourth possible implementation of the first aspect, the method further includes: sending, by the server, indication information, where the indication information is used to instruct the first vehicle to increase the running speed to a second preset speed.

When the lane on which the vehicle is located becomes wider, the vehicle is instructed to increase the running speed, so that the vehicle can run at an unimpeded speed, thereby further improving a user's driving experience.

With reference to the first aspect or the first possible implementation of the first aspect, in a fifth possible implementation of the first aspect, the adjusting a lane quantity of the road at a lane layer according to the traffic flow of the road includes: when the traffic flow of the road increases, a quantity N of lanes on the road is less than a second preset value $N_{max}$, and a traffic flow of each of the N lanes on the road reaches a preset flow, redividing, at the lane layer, the road into M lanes, where $N < M \leq N_{max}$.

The second preset value $N_{max}$ may be a maximum value of a quantity of lanes that are allowed to be divided on the road.

The traffic flow of the road can be increased by increasing the quantity of lanes, and therefore, traffic efficiency can be improved.

With reference to the fifth possible implementation of the first aspect, in a sixth possible implementation of the first aspect, the method further includes: receiving, by the server, a running speed that is of a second vehicle running on the road and that is reported by a second in-vehicle apparatus; and when the running speed of the second vehicle is less than a third preset speed, sending, by the server, indication information, where the indication information is used to instruct the second vehicle to increase the running speed to the third preset speed.

The traffic flow of the road can be increased by instructing the vehicle to increase the running speed, and therefore, traffic efficiency can be improved.

With reference to the fifth possible implementation of the first aspect, in a seventh possible implementation of the first aspect, the method further includes: receiving, by the server, a running speed that is of a second vehicle running on the road and that is reported by a second in-vehicle apparatus; obtaining, by the server, traffic density of a lane on which the second vehicle is located; and when the traffic density of the lane on which the second vehicle is located is less than preset traffic density, and the running speed of the second vehicle is greater than a fourth preset speed, sending, by the server, indication information, where the indication information is used to instruct the vehicle to decrease the running speed to the fourth preset speed and reduce a distance from the second vehicle to an adjacent vehicle ahead.

The vehicle is instructed to decrease the running speed to the preset speed, so that running safety of the vehicle can be improved. In addition, the traffic density of the lane can be increased by reducing the distance from the vehicle to the adjacent vehicle ahead. When the running speed of the vehicle exceeds the preset speed, the running speed of the vehicle is decreased and the traffic density of the lane is increased, so that the traffic flow of the lane can be increased while traffic safety is ensured.

The preset speeds in the foregoing possible implementations may be preconfigured in the server, or may be calculated by the server according to information about a lane on which the vehicle is currently located. For example, the information about the lane may include a lane width, and may further include road surface quality, a gradient, or another factor. Optionally, the server may calculate the preset speeds according to the information about the lane with reference to information such as a traffic flow or traffic density of the lane.

According to a second aspect, a traffic control method is provided. The method includes: receiving, by an in-vehicle apparatus, a lane layer of a map that is sent by a server, where the lane layer is obtained by the server by adjusting a lane of the road at an original lane layer of the map according to a traffic flow of a road on which the in-vehicle apparatus is located; updating, by the in-vehicle apparatus, the map according to the lane layer obtained after the adjustment; and instructing, by the in-vehicle apparatus according to the updated map, a vehicle on which the in-vehicle apparatus is located to run according to an adjusted lane.

The map used in the method includes a dynamic lane layer.

The map is updated according to the lane layer obtained after the adjustment that is sent by the server, and the vehicle is instructed, according to the updated map, to run according to the adjusted lane, so that the server can dynamically plan and control, according to the traffic flow, a precise lane on which the vehicle runs.

Optionally, the in-vehicle apparatus may further report a location of the vehicle on which the in-vehicle apparatus is located to the server.

Optionally, the in-vehicle apparatus may further report an identifier of the vehicle to the server.

With reference to the second aspect, in a first possible implementation of the second aspect, the method further includes: sending, by the in-vehicle apparatus, a location of the vehicle to the server; and receiving, by the in-vehicle apparatus, path change information sent by the server, where the path change information is determined by the server according to the adjusted lane and the location of the vehicle; and the instructing, by the in-vehicle apparatus according to the updated map, a vehicle on which the in-vehicle apparatus is located to run according to an adjusted lane includes: instructing, by the in-vehicle apparatus according to the updated map and the path change information, the vehicle to run, according to the adjusted lane, on a target lane obtained after replanning by the server.

With reference to the second aspect or the first possible implementation of the second aspect, in a second possible implementation of the second aspect, the method further includes:

reporting, by the in-vehicle apparatus, a running speed of the vehicle to the server; receiving, by the in-vehicle apparatus, indication information sent by the server; and instructing, by the in-vehicle apparatus according to the indication information, the vehicle to adjust the running speed.

According to a third aspect, a traffic control method is provided, including: receiving, by a server, a running speed of a vehicle running on a road that is reported by an in-vehicle apparatus of the vehicle; obtaining, by the server, a traffic flow of the road; determining, by the server, indication information according to the traffic flow of the road and the running speed of the vehicle, where the indication information is used to instruct the vehicle to adjust the running speed; and sending, by the server, the indication information.

The indication information that is used to instruct the vehicle to adjust the running speed is determined according to the traffic flow of the road and the running speed of the vehicle, and the indication information is sent, so that the vehicle can adjust the running speed according to the indication information. In this way, the running speed of the vehicle can be dynamically planned and controlled according to the traffic flow.

With reference to the third aspect, in a first possible implementation of the third aspect, when the traffic flow of the road increases, a traffic flow of the lane is less than a preset flow, and the running speed of the vehicle is less than a first preset speed, the indication information is used to instruct the vehicle to increase the running speed to the first preset speed.

With reference to the third aspect, in a second possible implementation of the third aspect, when the traffic flow of the road increases, a traffic flow of the lane is less than a preset flow, and the running speed of the vehicle is greater than a second preset speed, the indication information is used to instruct the vehicle to decrease the running speed to the second preset speed and reduce a distance from the vehicle to an adjacent vehicle ahead.

According to a fourth aspect, a traffic control method is provided, including: reporting, by an in-vehicle apparatus, a running speed of a vehicle on which the in-vehicle apparatus is located to a server; receiving, by the in-vehicle apparatus, indication information, where the indication information is determined by the server according to a traffic flow of a road on which the vehicle is located and the running speed; and instructing, by the in-vehicle apparatus according to the indication information, the vehicle to adjust the running speed.

The vehicle is instructed, according to the indication information that is determined by the server according to the traffic flow of the road and the running speed of the vehicle, to adjust the running speed, so that the server can adjust and control the running speed of the vehicle according to the traffic flow of the road.

The indication information may be used to instruct the vehicle to improve the running speed to a preset speed.

The indication information may be used to instruct the vehicle to decrease the running speed to a preset speed and reduce a distance from the vehicle to an adjacent vehicle ahead.

According to a fifth aspect, a server is provided, and is configured to perform the traffic control method according to the first aspect or any one of the foregoing possible implementations of the first aspect. Specifically, the server includes: an obtaining unit, configured to obtain a traffic flow of a road; a processing unit, configured to adjust a lane quantity or a lane width of the road at a lane layer on a map according to the traffic flow of the road that is obtained by the obtaining unit; and a sending unit, configured to send a lane layer obtained after the adjustment by the processing unit, so that a vehicle running on the road runs according to a lane obtained after the adjustment.

With reference to the fifth aspect, in a first possible implementation of the fifth aspect, the server further includes: a first receiving unit, configured to receive a location of the vehicle that is reported by an in-vehicle apparatus of the vehicle running on the road, where the processing unit is further configured to: replan, according to the lane obtained after the adjustment and the location of the vehicle that is received by the first receiving unit, a lane on which the vehicle runs, and determine path change information; and the sending unit is further configured to send the path change information to the in-vehicle apparatus, where the path change information is used to instruct the vehicle to run, according to the lane obtained after the adjustment, on a target lane obtained after the replanning.

With reference to the fifth aspect or the first possible implementation of the fifth aspect, in a second possible implementation of the fifth aspect, the server further includes: a second receiving unit, configured to receive an identifier that is of a first vehicle running on the road and that is reported by a first in-vehicle apparatus, where the processing unit is further configured to determine an attribute of the first vehicle according to the identifier of the first vehicle that is received by the second receiving unit; and the processing unit is specifically configured to: when the attribute of the first vehicle satisfies a preset condition, increase, at the lane layer, a width of a lane on which the first vehicle is located and decrease a width of another lane on the road.

With reference to the fifth aspect or the first possible implementation of the fifth aspect, in a third possible implementation of the fifth aspect, the server further includes: a second receiving unit, configured to receive a running speed that is of a first vehicle running on the road and that is reported by a first in-vehicle apparatus, where the processing unit is specifically configured to: when the traffic flow of the road decreases, a difference between the running speed of the first vehicle and a first preset speed is less than a preset threshold, and a quantity N of lanes on the road is greater than a first preset value $N_{min}$, redivide, at the lane layer, the road into M lanes, where $N_{min} \leq M < N$.

With reference to the second or the third possible implementation of the fifth aspect, in a fourth possible implementation of the fifth aspect, the sending unit is further configured to send indication information, where the indication information is used to instruct the first vehicle to increase the running speed to a second preset speed.

With reference to the fifth aspect or the first possible implementation of the fifth aspect, in a fifth possible implementation of the fifth aspect, the processing unit is specifically configured to: when the traffic flow of the road increases, a quantity N of lanes on the road is less than a second preset value $N_{max}$, and a traffic flow of each of the N lanes on the road reaches a preset flow, redivide, at the lane layer, the road into M lanes, where $N < M \leq N_{max}$.

With reference to the fifth possible implementation of the fifth aspect, in a sixth possible implementation of the fifth aspect, the server further includes: a third receiving unit, configured to receive a running speed that is of a second vehicle running on the road and that is reported by a second in-vehicle apparatus, where the sending unit is further configured to: when the running speed of the second vehicle is less than a third preset speed, send, by the server, indication information, where the indication information is used to instruct the second vehicle to increase the running speed to the third preset speed.

With reference to the fifth possible implementation of the fifth aspect, in a seventh possible implementation of the fifth aspect, the server further includes: a third receiving unit, configured to receive a running speed that is of a second vehicle running on the road and that is reported by a second in-vehicle apparatus, where the obtaining unit is further configured to obtain traffic density of a lane on which the second vehicle is located; and the sending unit is further configured to: when the traffic density of the lane on which the second vehicle is located is less than preset traffic density, and the running speed of the second vehicle is greater than a fourth preset speed, send indication information, where the indication information is used to instruct the second vehicle to decrease the running speed to the fourth preset speed and reduce a distance from the second vehicle to an adjacent vehicle ahead.

According to a sixth aspect, an in-vehicle apparatus is provided, and is configured to perform the traffic control method according to the second aspect or any one of the foregoing possible implementations of the second aspect. Specifically, the in-vehicle apparatus includes: a receiving unit, configured to receive a lane layer of a map that is sent by a server, where the lane layer is obtained by the server by adjusting a lane of the road at an original lane layer of the map according to a traffic flow of a road on which the in-vehicle apparatus is located; a processing unit, configured to update the map according to the lane layer received by the receiving unit; and an instruction unit, configured to instruct, according to the map updated by the processing unit, a vehicle on which the in-vehicle apparatus is located to run according to an adjusted lane.

With reference to the sixth aspect, in a first possible implementation of the sixth aspect, the in-vehicle apparatus further includes: a first sending unit, configured to send a location of the vehicle to the server, where the receiving unit is further configured to receive path change information sent by the server, where the path change information is determined by the server according to the adjusted lane and the location of the vehicle; and the instruction unit is specifically configured to instruct, by the in-vehicle apparatus according to the updated map and the path change information, the vehicle to run, according to the adjusted lane, on a target lane obtained after replanning by the server.

With reference to the sixth aspect or the first possible implementation of the sixth aspect, in a second possible implementation of the sixth aspect, the in-vehicle apparatus further includes: a second sending unit, configured to report a running speed of the vehicle to the server, where the receiving unit is further configured to receive indication information that is sent by the server according to the running speed of the vehicle; and the instruction unit is further configured to instruct, according to the indication information, the vehicle to adjust the running speed.

According to a seventh aspect, a server is provided, and is configured to perform the traffic control method according to the third aspect or any one of the foregoing possible implementations of the third aspect. Specifically, the server includes: a receiving unit, configured to receive a running speed of a vehicle running on a road that is reported by an in-vehicle apparatus of the vehicle; an obtaining unit, configured to obtain a traffic flow of the road; a processing unit, configured to determine indication information according to the traffic flow of the road that is obtained by the obtaining unit and the running speed of the vehicle that is received by the receiving unit, where the indication information is used to instruct the vehicle to adjust the running speed; and a sending unit, configured to send the indication information.

With reference to the seventh aspect, in a first possible implementation of the seventh aspect, when the traffic flow of the road increases, a traffic flow of the lane is less than a preset flow, and the running speed of the vehicle is less than a first preset speed, the indication information is used to instruct the vehicle to increase the running speed to the first preset speed.

With reference to the seventh aspect, in a second possible implementation of the seventh aspect, when the traffic flow of the road increases, a traffic flow of the lane is less than a preset flow, and the running speed of the vehicle is greater than a second preset speed, the indication information is used to instruct the vehicle to decrease the running speed to the second preset speed and reduce a distance from the vehicle to an adjacent vehicle ahead.

According to an eighth aspect, an in-vehicle apparatus is provided, and is configured to perform the traffic control method according to the fourth aspect. Specifically, the in-vehicle apparatus includes: a sending unit, configured to report a running speed of a vehicle on which the in-vehicle apparatus is located to a server; a receiving unit, configured to receive indication information, where the indication information is determined by the server according to a traffic flow of a road on which the vehicle is located and the running speed; and an instruction unit, configured to instruct, according to the indication information received by the receiving unit, the vehicle to adjust the running speed.

According to a ninth aspect, a server is provided, including a processor, a memory, a bus system, and a transceiver. The processor, the memory, and the transceiver are connected to each other by using the bus system. The memory is configured to store an instruction. The processor is configured to execute the instruction stored in the memory, so that the server performs the traffic control method according to the first aspect or any one of the foregoing possible implementations of the first aspect.

Optionally, the transceiver may be implemented by a transmitter.

According to a tenth aspect, an in-vehicle apparatus is provided, including a processor, a memory, a bus system, and a transceiver. The processor, the memory, and the transceiver are connected to each other by using the bus system. The memory is configured to store an instruction. The processor is configured to execute the instruction stored in the memory, so that the server performs the traffic control method according to the second aspect or any one of the foregoing possible implementations of the second aspect.

Optionally, the transceiver may be implemented by a receiver.

According to a eleventh aspect, a server is provided, including a processor, a memory, a bus system, and a transceiver. The processor, the memory, and the transceiver are connected to each other by using the bus system. The memory is configured to store an instruction. The processor is configured to execute the instruction stored in the memory, so that the server performs the traffic control method according to the third aspect or any one of the foregoing possible implementations of the third aspect.

According to a twelfth aspect, an in-vehicle apparatus is provided, including a processor, a memory, a bus system, and a transceiver. The processor, the memory, and the transceiver are connected to each other by using the bus system. The memory is configured to store an instruction.

The processor is configured to execute the instruction stored in the memory, so that the server performs the traffic control method according to the fourth aspect or any one of the foregoing possible implementations of the fourth aspect.

DESCRIPTION OF EMBODIMENTS

Figure 1:
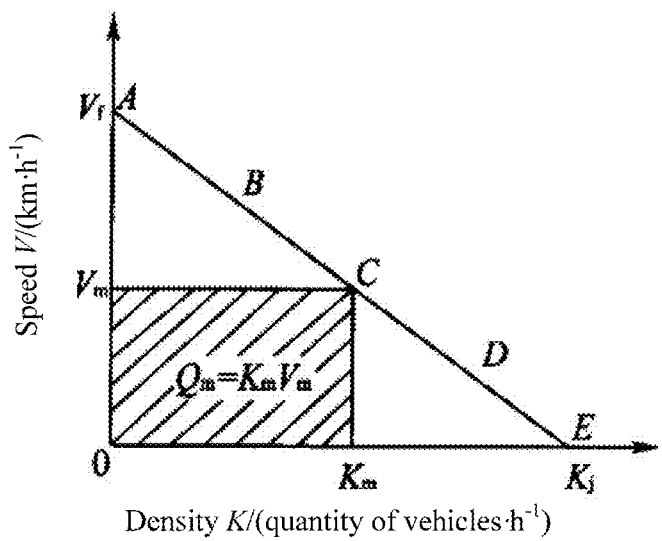
FIG. 1 is a schematic diagram of a relationship between a traffic flow, a vehicle speed, and traffic density.

The following describes the technical solutions in the embodiments of the present invention with reference to the accompanying drawings in the embodiments of the present invention. FIG. 1 shows that a relationship between a traffic flow Q, a speed V, and density K of a single lane is $Q = K \cdot V$ The following first describes with reference to FIG. 1 some terms that reflect traffic flow features of a lane.

A maximum flow $Q_m$ (quantity of vehicles/h) is a maximum value of a traffic flow of the lane.

A critical speed $V_m$ (km/h) is a speed obtained when the traffic flow of the lane reaches the maximum.

An unimpeded running speed $V_f$ (km/h) is an average speed at which a vehicle can run unimpededly when traffic density tends to zero.

Critical density $K_m$ (quantity of vehicles/km) is traffic density obtained when the traffic flow reaches the maximum.

Jam density $K_j$ (quantity of vehicles/km) is traffic density obtained when a vehicle cannot move (that is, a vehicle speed is zero).

In the embodiments of the present invention, because a quantity of lanes at a lane layer changes, the foregoing formula is expanded to obtain the following formula:

$$Qr = \sum_{i=1}^{n} Qi = \sum_{i=1}^{n} (Ki \cdot Vi) \qquad (1)$$

where Qr is a traffic flow (quantity of vehicles/h) of a road, Qi is a traffic flow (quantity of vehicles/h) of a single lane, Ki is average traffic density (quantity of vehicles/km) of the single lane, Vi is an interval average speed (km/h) of the single lane, and n is a lane quantity.

It can be learned from the foregoing formula that a traffic flow of a segment of a road is a sum of traffic flows of all lanes. Herein, each lane may have different traffic density and a different average speed. In this embodiment of the present invention, for the traffic flow of the road, a traffic flow in a single direction is used as an example. It can be learned from the foregoing formula (1) that, the traffic flow of the road can be increased by increasing any one of the quantity of lanes, the traffic density of the lane, or the running speed of the vehicle.

In recent years, as intelligent transportation technologies develop rapidly, self-driving has become a major trend. Network communication-based self-driving will become a mainstream and an inevitable trend of future self-driving. In a network-based self-driving scenario, a vehicle runs according to a high-precision navigation path, and therefore, may no longer be limited by a physical lane specified by using an actual lane line. In this embodiment of the present invention, lane division on a map is no longer fixed, but a dynamic lane layer is added. In this way, a lane of a road can be dynamically adjusted at a lane layer on the map, so that the vehicle can run according to an adjusted lane.

Figure 2:
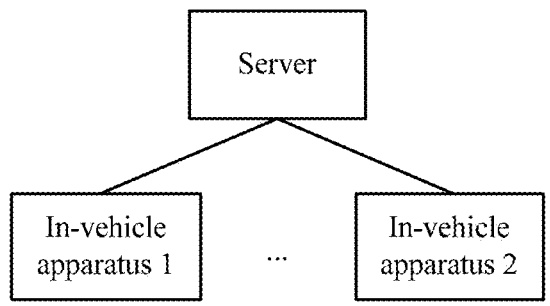
FIG. 2 is a schematic diagram of an application scenario according to an embodiment of the present invention.

FIG. 2 is a schematic diagram of an application scenario according to an embodiment of the present invention. FIG. 2 shows an intelligent traffic system architecture, including a server and an in-vehicle apparatus.

The server stores a high-precision map, and the map includes detailed and precise road information and a dynamic lane layer.

The in-vehicle apparatus may send a navigation request to the server, and the in-vehicle apparatus may further report vehicle information, such as a location, a running speed, or an identifier to the server. The server may provide a service for the in-vehicle apparatus according to the received request, and may further dynamically adjust lane division of a road according to a traffic flow of the road.

Figure 3:
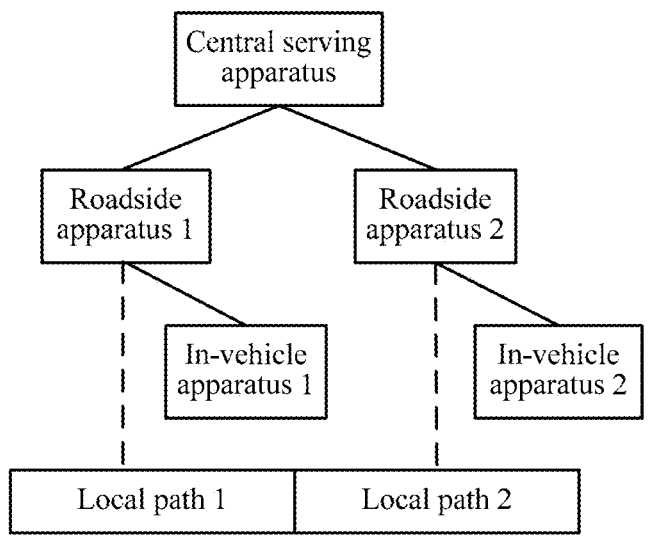
FIG. 3 is a schematic diagram of another application scenario according to an embodiment of the present invention.

FIG. 3 is a schematic diagram of an application scenario according to another embodiment of the present invention. FIG. 3 shows a network control-based intelligent three-tier transport architecture, including a central serving apparatus, a roadside apparatus, and an in-vehicle apparatus. The in-vehicle apparatus may communicate with the central serving apparatus by using the roadside apparatus, or may directly communicate with the central serving apparatus. The roadside apparatus may directly communicate with the in-vehicle apparatus.

(1) The central serving apparatus is responsible for global path planning.

A global path is a one-way driving route from a start point to an end point. The start point is usually a current location of a vehicle, and the end point may be specified by a passenger according to the passenger's need. Precision of the global path needs to reach a road level.

During global path planning, the central serving apparatus needs to consider dynamic road condition information of an entire road network, to perform intelligent analysis and comprehensive scheduling.

(2) The roadside apparatus is responsible for local path planning.

A local path is a detailed driving route on a relatively short route from a location of a car to a place ahead in a process in which the vehicle runs along a global path, and a range of the local path falls within coverage of the roadside apparatus. Precision of the local path needs to reach a lane level.

During local path planning, the roadside apparatus needs to consider lane attributes within an area, a load status of each lane, and a destination direction of a vehicle, to perform local vehicle scheduling and control in the area to implement lane load balancing, and improve traffic efficiency and quality (controlling a vehicle speed and parking less frequently) of vehicles.

The roadside apparatus needs to be deployed along a road side. Therefore, there may be multiple roadside apparatuses in a traffic system. The roadside apparatus also needs to have sufficient processing performance and relatively high reliability according to a service processing requirement.

(3) The in-vehicle apparatus is responsible for independent path planning by a vehicle.

An independent path is a temporary path that is planned by a vehicle without depending on path planning by the central serving apparatus and the roadside apparatus.

The independent path planning is emergency path adjustment performed by the vehicle for an ambient emergency situation or a simple decision-making scenario, for example, emergency obstacle avoidance.

Figure 4:
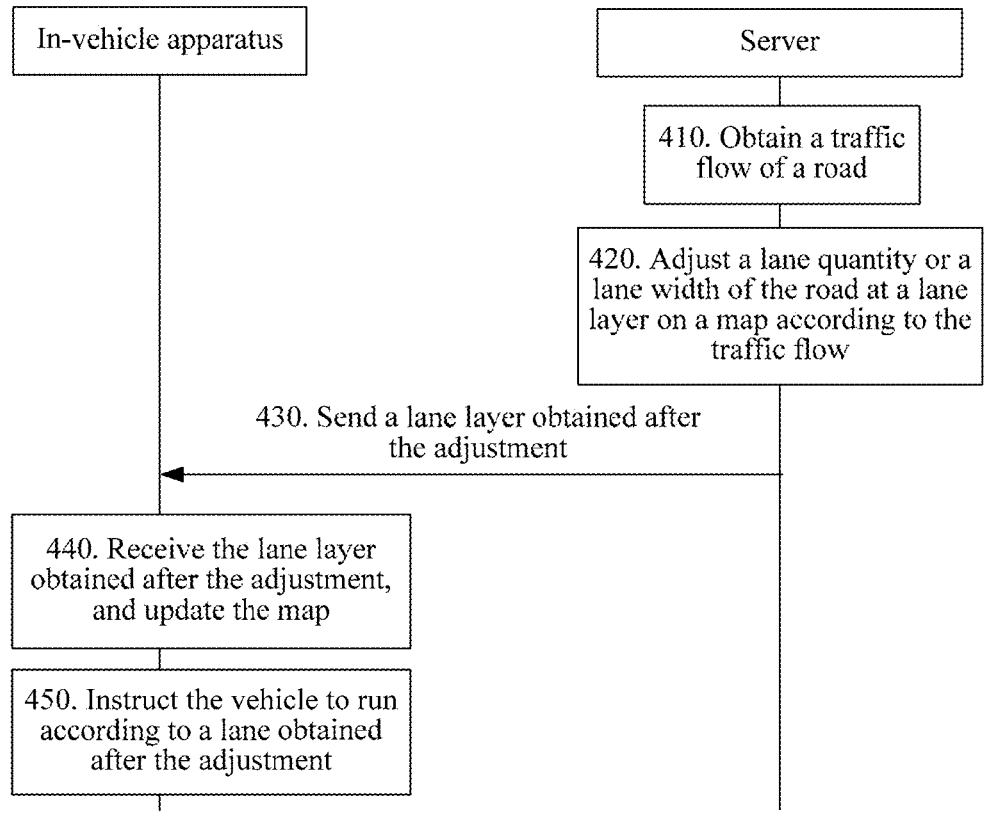
FIG. 4 is a schematic flowchart of a traffic control method according to an embodiment of the present invention.

FIG. 4 is a schematic flowchart of a traffic control method 400 according to an embodiment of the present invention. As shown in FIG. 4, the method 400 includes the following content.

410. A server obtains a traffic flow of a road.

For example, the server may monitor the traffic flow of the road in real time, or the server may determine the traffic flow of the road according to a location regularly reported by an in-vehicle apparatus, or may obtain the traffic flow of the road from another traffic monitoring system.

420. The server adjusts a lane quantity or a lane width of the road at a lane layer on a map according to the traffic flow of the road.

430. The server sends a lane layer obtained after the adjustment, so that a vehicle running on the road runs according to a lane obtained after the adjustment.

An implementation used by the server to send the lane layer obtained after the adjustment is not limited in this embodiment of the present invention, provided that the vehicle running on the road receives the lane layer obtained after the adjustment.

Optionally, the server may be the central serving apparatus in the architecture shown in FIG. 3.

It should be noted that when the central serving apparatus in the architecture shown in FIG. 3 communicates with the in-vehicle apparatus by using a roadside apparatus, the central serving apparatus sends the lane layer obtained after the adjustment to the roadside apparatus, so that the roadside apparatus forwards the lane layer obtained after the adjustment to the in-vehicle apparatus of the vehicle on the road.

Optionally, the server may be the roadside apparatus in the architecture shown in FIG. 3.

Optionally, the server may be a device having functions of both the central serving apparatus and the roadside apparatus in the architecture shown in FIG. 3.

440. The in-vehicle apparatus receives the lane layer obtained after the adjustment, and updates the map according to the lane layer obtained after the adjustment.

450. The in-vehicle apparatus instructs, according to the updated map, the vehicle to run according to the lane obtained after the adjustment.

The in-vehicle apparatus may change a current running path according to the lane obtained after the adjustment and according to a preconfigured parameter or algorithm, so that the vehicle runs on the lane obtained after the adjustment.

Figure 5:
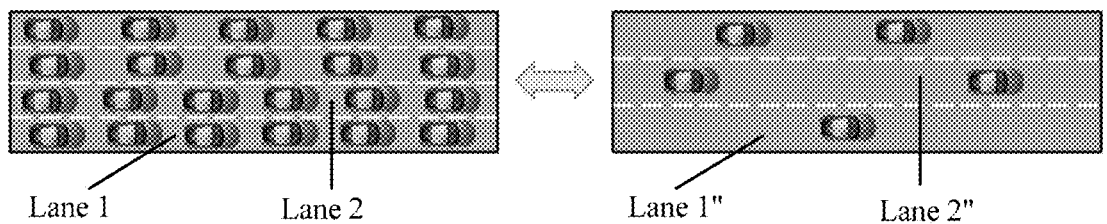
FIG. 5 is a schematic diagram of lane adjustment in a traffic control method according to an embodiment of the present invention.

The in-vehicle apparatus may instruct, according to the updated map, the vehicle to move from a current lane to the lane obtained after the adjustment for running. For example, the in-vehicle apparatus may instruct, according to the updated map, the vehicle to move from a current lane to a lane closest to the current lane for running. As shown in FIG. 5, the left shows original lane division, and the right shows lane division after the adjustment. An in-vehicle apparatus of a vehicle running on a lane 1 may instruct, according to a lane that is obtained through redivision, the vehicle to move to a lane 1" closest to a current location for running. When distances from two lanes to the vehicle are the same, the vehicle may move to either lane for running. As shown in FIG. 5, a vehicle running on a lane 2 may move to the lane 1" for running, or may move to a lane 2" for running.

In this embodiment of the present invention, the traffic flow of the road is obtained, and the lane of the road is adjusted at the lane layer on the map according to the traffic flow of the road, so that the vehicle running on the road can run according to the lane obtained after the adjustment. In this way, a precise lane on which the vehicle runs can be dynamically planned and controlled according to the traffic flow.

Optionally, in the method 400, the in-vehicle apparatus may further report a location of the vehicle to the server. Correspondingly, the server may replan, according to the lane obtained after the adjustment and the location of the vehicle, the lane on which the vehicle runs, and sends path change information to the in-vehicle apparatus. The in-vehicle apparatus may instruct, according to the received path change information, the vehicle to run, according to the lane obtained after the adjustment, on a target lane obtained after the replanning.

Figure 6:
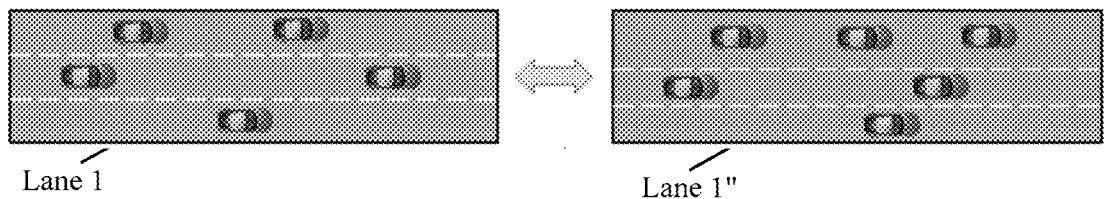
FIG. 6 is a schematic diagram of lane adjustment in a traffic control method according to another embodiment of the present invention.

Optionally, the in-vehicle apparatus may further report an identifier of the vehicle. Correspondingly, the server may determine an attribute of the vehicle according to the identifier of the vehicle. In step 420, when the attribute of the vehicle satisfies a preset condition, the server increases, at the lane layer, a width of the lane on which the vehicle is located and decreases a width of another lane on the road. As shown in FIG. 6, the left shows lane division before the adjustment, and the right shows lane division after the adjustment.

Optionally, when a width of a lane on which the vehicle is located is adjusted according to the attribute of the vehicle, the traffic flow of the road may be further considered. For example, in step 420, when the traffic flow of the road is less than a preset flow, and the attribute of the vehicle satisfies a preset condition, the server increases, at the lane layer, the width of the lane on which the vehicle is located and decreases a width of another lane on the road.

The identifier of the vehicle is used to identify the vehicle. For example, the identifier of the vehicle may be a license plate number. Related information of the vehicle may be prestored in the server, for example, the identifier or the attribute of the vehicle.

In the prior art, it can be learned, according to a feature analysis of free vehicle speeds of road segments, that within a range, a wider lane indicates a higher speed at which a vehicle may run on the lane. That is, a wider lane indicates a higher unimpeded running speed that is allowed on the lane.

The width of the lane on which the vehicle is located is increased, so that an unimpeded running speed of the vehicle on the lane becomes higher.

For example, when the vehicle is a vehicle for performing an emergency task, for example, emergency vehicles such as police cars, firefighting trucks, and ambulances, or another special task, the width of the lane on which the vehicle is located is increased, to ensure that the vehicle can run at an unimpeded speed, thereby meeting a special social requirement.

Optionally, in step 420, when the traffic flow of the road decreases, a running speed of the vehicle is equal to a preset speed, and a quantity N of lanes on the road is greater than a preset value $N_{min}$, the server may redivide, at the lane layer, the road into M lanes, where $N_{min} \leq M < N$, as shown in FIG. 5.

In this embodiment of the present invention, a quantity of lanes is decreased within an allowed range, so that a width of each lane can be increased, and driving experience can be improved.

When a width of a lane on which a vehicle is located becomes wider, correspondingly, an unimpeded speed that is allowed on the lane is accordingly increased. Optionally, the server may further send indication information, where the indication information is used to instruct vehicle to increase the running speed to the preset speed. For example, the preset speed may be an unimpeded speed of a lane on which the vehicle is currently located, for example, $V_f$ shown in FIG. 1.

In this embodiment of the present invention, the vehicle is instructed with reference to an actual traffic flow to increase the running speed, so that the vehicle can run at an unimpeded speed, thereby improving passenger experience.

Optionally, in step 420, when the traffic flow of the road increases, a quantity N of lanes on the road is less than a preset value $N_{max}$, and a traffic flow of each of the N lanes on the road reaches a preset flow, the server redivides, at the lane layer, the road into M lanes, where $N < M \leq N_{max}$.

As shown in FIG. 5, the right shows lane division before the adjustment, and the left shows lane division after the adjustment.

In this embodiment of the present invention, a quantity of lanes is increased within an allowed range, so that the traffic flow of the road can be increased, to maximize the traffic flow of the road, thereby improving traffic efficiency.

Similarly, after increasing the lane quantity of the road, the server may further increase the traffic flow of the road by instructing the vehicle to increase the running speed, to resolve a traffic efficiency problem.

Optionally, the server may further obtain traffic density of the lane on which the vehicle is located. Correspondingly, when the traffic density of the lane is less than preset traffic density, and the running speed of the vehicle is greater than a preset speed, the server sends indication information, to instruct the vehicle to decrease the running speed to the preset speed and reduce a distance from the vehicle to an adjacent vehicle ahead. For example, the preset speed may be a critical speed of the lane, for example, $V_m$ shown in FIG. 1.

The traffic density of the lane may be increased by reducing the distance from the vehicle to an adjacent vehicle ahead.

When the traffic flow of the road increases, and the running speed of the vehicle exceeds an allowed preset speed, the vehicle is instructed to decrease the running speed to an allowed running speed, and the traffic density is increased, so that the traffic flow of the road can be further increased, thereby resolving a traffic efficiency problem. In addition, when the traffic density increases, traffic safety can be further ensured by decreasing the running speed of the vehicle.

In this embodiment of the present invention, the lane quantity and the lane width of the road are no longer fixed, but are dynamically adjusted according to a requirement. In addition, a precise path on which the vehicle runs may be further dynamically planned and controlled, so that a traffic flow and a driving speed can be flexibly adjusted and controlled.

Figure 7:
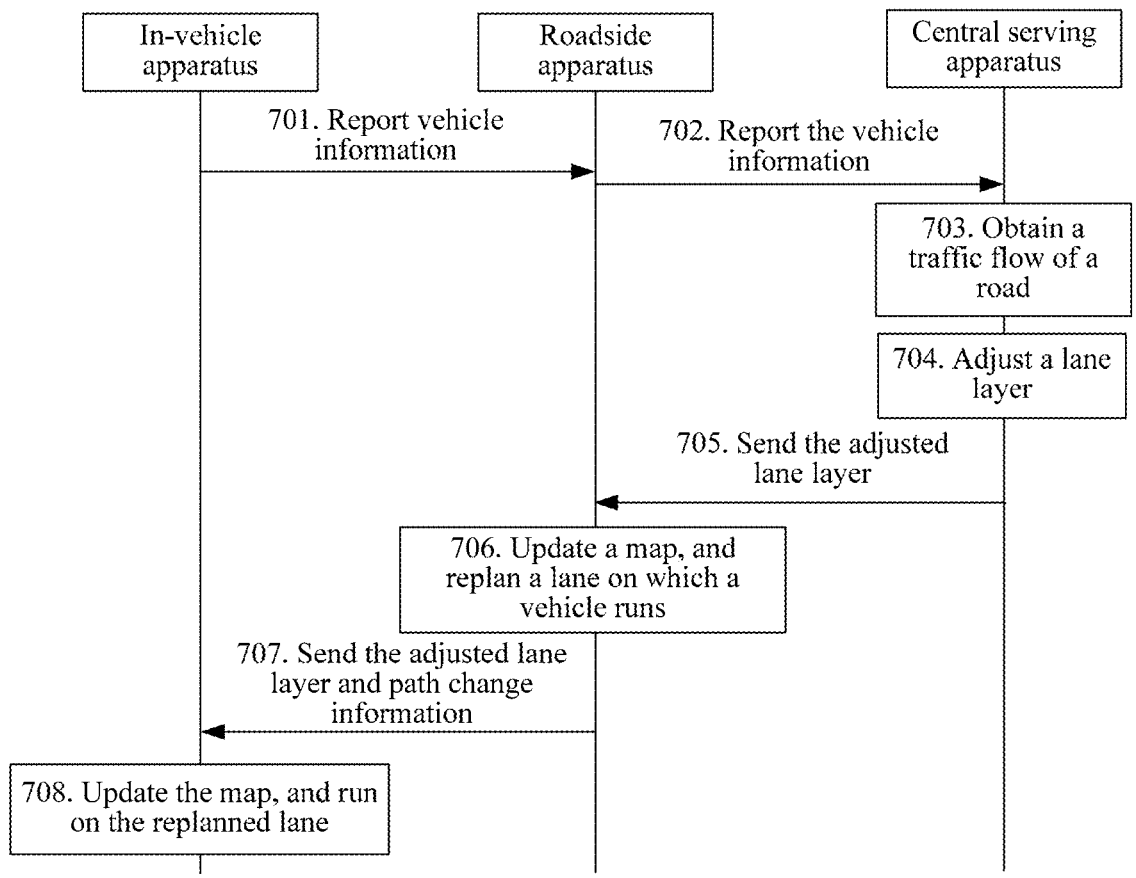
FIG. 7 is a schematic flowchart of a traffic control method according to another embodiment of the present invention.

The following describes, with reference to FIG. 7, a method according to an embodiment of the present invention by using an example in which a server is a central serving apparatus. The central serving apparatus and a roadside apparatus may monitor in real time a status such as a traffic flow of a road, traffic density, or a vehicle speed. As shown in FIG. 7, a traffic control method 700 includes the following content.

701. An in-vehicle apparatus reports vehicle information, where the vehicle information may include a location of a vehicle.

Optionally, the vehicle information may further include a running speed or an identifier of the vehicle.

702. The roadside apparatus receives the vehicle information reported by the in-vehicle apparatus, and forwards the vehicle information to the central serving apparatus.

It should be noted that the vehicle information may also be directly sent by the in-vehicle apparatus to a central service apparatus without being forwarded by the roadside apparatus.

703. The central serving apparatus receives the vehicle information that is reported by the in-vehicle apparatus and that is forwarded by the roadside apparatus, and determines a traffic flow of a road according to the location of the vehicle.

It should be understood that the central serving apparatus may further determine a traffic flow and traffic density on each lane according to the vehicle information.

704. The central serving apparatus determines, according to the traffic flow of the road, whether a lane of the road needs to be adjusted, and adjusts the lane at a lane layer when the lane needs to be adjusted.

For a specific method for adjusting the lane at the lane layer, refer to the foregoing description. Details are not described herein again.

705. The central serving apparatus sends a lane layer obtained after the adjustment to the roadside apparatus.

706. The roadside apparatus receives the lane layer obtained after the adjustment, updates a map according to the lane layer obtained after the adjustment, replans, according to the updated map, a lane on which the vehicle runs, and determines path change information.

Optionally, the roadside apparatus may monitor in real time a load status of the road, for example, the traffic flow of the road, or the traffic density. The roadside apparatus may plan, according to the updated map and the load status of the road, a lane-level running path of a vehicle of a corresponding road segment.

707. The roadside apparatus sends the lane layer obtained after the adjustment and the path change information to the in-vehicle apparatus.

Specifically, the roadside apparatus sends the lane layer obtained after the adjustment to all vehicles on the road. In addition, the roadside apparatus may separately send, to the vehicles, path change information respectively corresponding to the vehicles, or may send path change information of all the vehicles to the vehicles. A vehicle may select path change information of the vehicle according to an identifier of the vehicle. In this way, the vehicle may run, according to the lane layer obtained after the adjustment and the path change information, on a target lane obtained after the replanning.

Optionally, the central serving apparatus or the roadside apparatus may further determine, according to the traffic flow, the traffic density, or the running speed of the vehicle, indication information used to instruct the vehicle to adjust the running speed. The roadside apparatus may further send the indication information to the corresponding vehicle, so that the vehicle can correspondingly adjust the running speed.

708. The in-vehicle apparatus receives the lane layer obtained after the adjustment and the path change information that are sent by the roadside apparatus, updates the map according to the received lane layer obtained after the adjustment, and runs, according to the path change information and the lane obtained after the adjustment on the updated map, on a target lane obtained after the replanning.

In the embodiment shown in FIG. 7, the adjustment for the lane is decided and performed by the central serving apparatus.

It should be understood that when the server in the method 700 is the roadside apparatus, the adjustment for the lane is decided and performed by the roadside apparatus.

In this embodiment of the present invention, according to the traffic flow of the road by means of communications and collaboration between the server and the in-vehicle apparatus, dynamic adjustment of a lane quantity and a lane width can be controlled, and dynamic change of a path on which a vehicle runs can be controlled, thereby implementing overall adjustment and control of the traffic flow and the vehicle speed.

Figure 8:
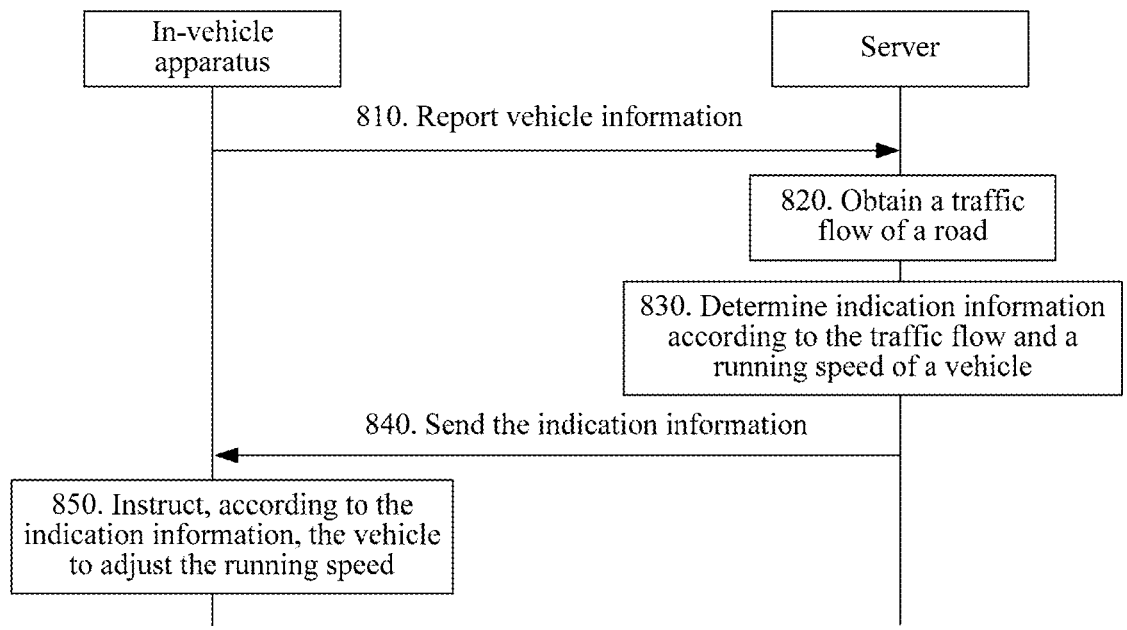
FIG. 8 is a schematic flowchart of a traffic control method according to another embodiment of the present invention.

FIG. 8 is a schematic flowchart of a traffic control method 800 according to another embodiment of the present invention.

810. An in-vehicle apparatus reports vehicle information of a vehicle on which the in-vehicle apparatus is located to a server, where the vehicle information includes a location and a running speed of the vehicle.

The server receives the location and the running speed of the vehicle.

820. The server obtains a traffic flow of the road.

For example, the server may monitor in real time the traffic flow of the road on which a lane is located.

830. The server determines indication information according to the traffic flow of the road and the running speed of the vehicle, where the indication information is used to instruct the vehicle to adjust the running speed.

840. The server sends the indication information.

850. The in-vehicle apparatus receives the indication information, and instructs, according to the indication information, the vehicle to adjust the running speed.

In this embodiment of the present invention, the indication information that is used to instruct the vehicle to adjust the running speed is determined according to the traffic flow of the road and the running speed of the vehicle, and the indication information is sent, so that the vehicle can adjust the running speed according to the indication information. In this way, the running speed of the vehicle can be dynamically planned and controlled according to the traffic flow.

Optionally, when the traffic flow of the road increases, the traffic flow of the lane is less than a preset flow, and the running speed of the vehicle is less than a first preset speed, the indication information is used to instruct the vehicle to increase the running speed to the first preset speed. Correspondingly, the in-vehicle apparatus may instruct, according to the indication information, the vehicle to increase the running speed to the first preset speed.

The traffic flow of the road can be increased by instructing the vehicle to increase the running speed, and therefore, traffic efficiency can be improved.

Optionally, when the traffic flow of the road increases, the traffic flow of the lane is less than a preset flow, and the running speed of the vehicle is greater than a second preset speed, the indication information is used to instruct the vehicle to decrease the running speed to the second preset speed, and reduce a distance from the vehicle to an adjacent vehicle ahead. The second preset speed may be a maximum safe speed that is allowed on the lane on which the vehicle is located.

The vehicle is instructed to decrease the running speed to the preset speed, so that running safety of the vehicle can be improved. In addition, the traffic density of the lane can be increased by reducing the distance from the vehicle to the adjacent vehicle ahead. When the running speed of the vehicle exceeds the preset speed, the running speed of the vehicle is decreased and the traffic density of the lane is increased, so that the traffic flow of the lane can be increased while traffic safety is ensured.

The server in this embodiment of the present invention may be the roadside apparatus or the central serving apparatus in the architecture shown in FIG. 3, or may be a device having functions of both the roadside apparatus and the central serving apparatus.

The foregoing describes the traffic control method according to the embodiments of the present invention with reference to FIG. 4 to FIG. 8. The following describes a server and an in-vehicle apparatus according to the embodiments of the present invention with reference to FIG. 9 to FIG. 14.

Figure 9:
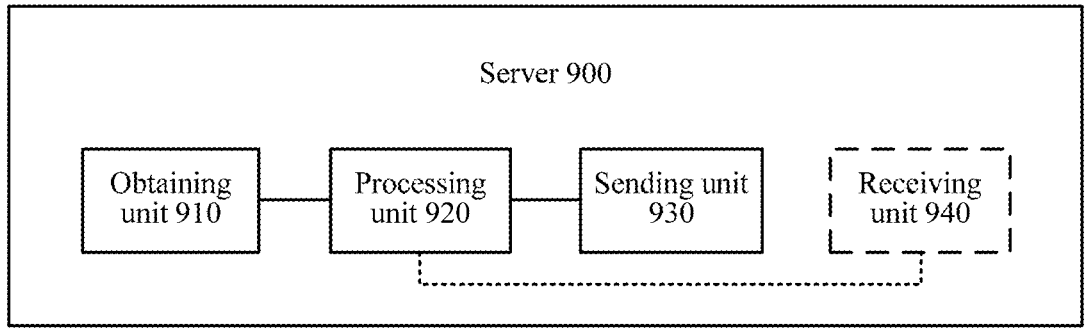
FIG. 9 is a schematic structural diagram of a server according to an embodiment of the present invention.

As shown in FIG. 9, FIG. 9 is a schematic structural diagram of a server 900 according to an embodiment of the present invention. As shown in FIG. 9, the server 900 includes an obtaining unit 910, a processing unit 920, and a sending unit 930.

The obtaining unit 910 is configured to obtain a traffic flow of a road.

The processing unit 920 is configured to adjust a lane quantity or a lane width of the road at a lane layer on a map according to the traffic flow of the road that is obtained by the obtaining unit.

The sending unit 930 is configured to send a lane layer obtained after the adjustment by the processing unit, so that a vehicle running on the road runs according to a lane obtained after the adjustment.

In this embodiment of the present invention, the traffic flow of the road is obtained, and the lane of the road is adjusted at the lane layer on the map according to the traffic flow of the road, so that the vehicle running on the road can run according to the lane obtained after the adjustment. In this way, a precise lane on which the vehicle runs can be dynamically planned and controlled according to the traffic flow.

Optionally, the server 900 may further include a receiving unit 940, configured to receive vehicle information reported by an in-vehicle apparatus.

Figure 10:
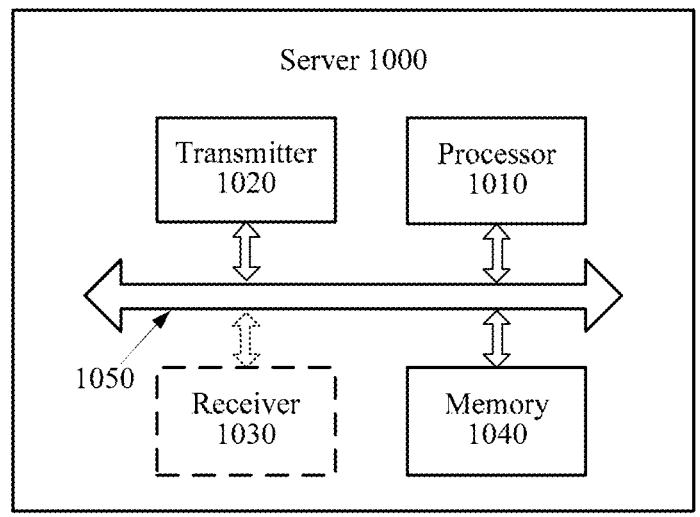
FIG. 10 is a schematic structural diagram of a server according to another embodiment of the present invention.

It should be noted that, in this embodiment of the present invention, the obtaining unit 910 may be implemented by a processor, the processing unit 920 may be implemented by the processor, the sending unit 930 may be implemented by a transmitter, and the receiving unit 940 may be implemented by a receiver. As shown in FIG. 10, the server 1000 includes a processor 1010, a transmitter 1020, a receiver 1030, and a memory 1040. The memory 1040 may be configured to store related information of a map or a vehicle, or may be configured to store code executed by the processor 1010, or the like. Components in the server 1000 are connected together by using a bus system 1050. The bus system 1050 further includes a power bus, a control bus, and a status signal bus in addition to a data bus.

It should be understood that the server 900 shown in FIG. 9 or the server 1000 shown in FIG. 10 may correspond to the server in the traffic control method 400 according to the embodiments of the present invention, and the foregoing and other operations and/or functions of the modules/units in the server 900 or the server 1000 are used to separately implement the corresponding procedures of the method 400 in FIG. 4. For brevity, details are not described herein.

It should be noted that the foregoing method embodiment of the present invention may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA), or another programmable logic component, a discrete gate or a transistor logic component, or a discrete hardware component. It may implement or perform the methods, the steps, and logical block diagrams that are disclosed in the embodiments of the present invention. The general purpose processor may be a microprocessor, or the processor may be any normal processor, or the like. Steps of the methods disclosed with reference to the embodiments of the present invention may be directly embodied as being implemented by a hardware decoding processor, or implemented by a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. RAMs in many forms such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synch-link dynamic random access memory (Synchlink DRAM, SLDRAM), and a direct rambus random access memory (Direct Rambus RAM, DR RAM) may be used. Those are examples rather than limitative descriptions. It should be noted that the memory of the systems and methods described in this specification includes but is not limited to these and any memory of another proper type.

Figure 11:
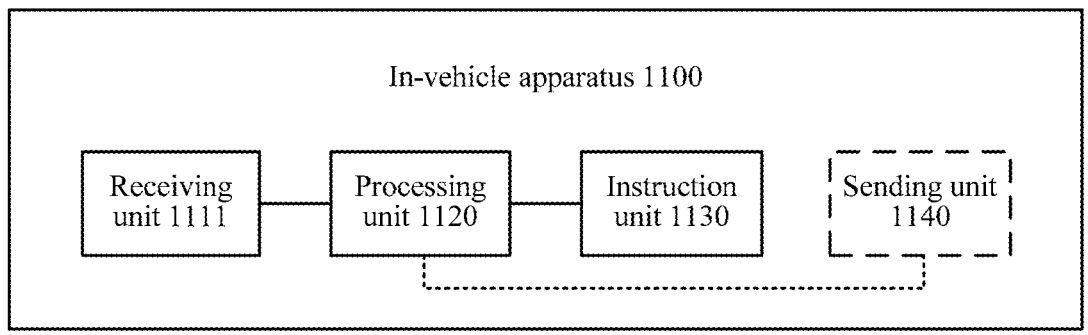
FIG. 11 is a schematic structural diagram of an in-vehicle apparatus according to an embodiment of the present invention.

As shown in FIG. 11, FIG. 11 is a schematic structural diagram of an in-vehicle apparatus 1100 according to an embodiment of the present invention. As shown in FIG. 11, the in-vehicle apparatus 1100 includes a receiving unit 1110, a processing unit 1120, and an instruction unit 1130.

The receiving unit 1110 is configured to receive a lane layer of a map that is sent by a server, where the lane layer is obtained by the server by adjusting a lane of the road at an original lane layer of the map according to a traffic flow of a road on which the in-vehicle apparatus is located.

The processing unit 1120 is configured to update the map according to the lane layer received by the receiving unit.

The instruction unit 1130 is configured to instruct, according to the map updated by the processing unit, a vehicle on which the in-vehicle apparatus is located to run according to an adjusted lane.

The map is updated according to the lane layer obtained after the adjustment that is sent by the server, and the vehicle is instructed, according to the updated map, to run according to the adjusted lane, so that the server can dynamically plan and control, according to the traffic flow, a precise lane on which the vehicle runs.

Optionally, the in-vehicle apparatus 1100 may further include a sending unit 1140, configured to report vehicle information.

Figure 12:
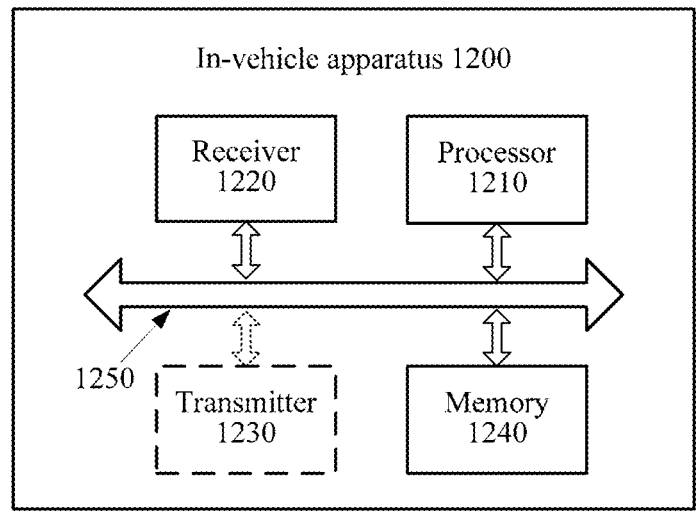
FIG. 12 is a schematic structural diagram of an in-vehicle apparatus according to another embodiment of the present invention.

It should be noted that, in this embodiment of the present invention, the receiving unit 1110 may be implemented by a receiver, the processing unit 1120 may be implemented by a processor, the instruction unit 1130 may be implemented by the processor, and the sending unit 1140 may be implemented by a transmitter. As shown in FIG. 12, the in-vehicle apparatus 1200 includes a processor 1210, a receiver 1220, a transmitter 1230, and a memory 1240. The memory 1240 may be configured to store a map, or may be configured to store code executed by the processor 1210, or the like. Components in the in-vehicle apparatus 1200 are connected together by using a bus system 1250. The bus system 1250 further includes a power bus, a control bus, and a status signal bus in addition to a data bus.

It should be understood that the in-vehicle apparatus 1100 shown in FIG. 11 or the in-vehicle apparatus 1200 shown in FIG. 12 may correspond to the in-vehicle apparatus in the traffic control method 400 according to the embodiments of the present invention, and the foregoing and other operations and/or functions of the modules/units in the in-vehicle apparatus 1000 or the in-vehicle apparatus 1200 are used to separately implement the corresponding procedures of the method 400 in FIG. 4. For brevity, details are not described herein.

It should be noted that the foregoing method embodiment of the present invention may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general purpose processor, a DSP, an ASIC, an FPGA, or another programmable logic component, a discrete gate or a transistor logic component, or a discrete hardware component. It may implement or perform the methods, the steps, and logical block diagrams that are disclosed in the embodiments of the present invention. The general purpose processor may be a microprocessor, or the processor may be any normal processor, or the like. Steps of the methods disclosed with reference to the embodiments of the present invention may be directly embodied as being implemented by a hardware decoding processor, or implemented by a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The non-volatile memory may be a ROM, a PROM, an EPROM, an EEPROM, or a flash memory. The volatile memory may be a RAM, and is used as an external cache. RAMs in many forms such as an SRAM, a DRAM, an SDRAM, a DDR SDRAM, an ESDRAM, an SLDRAM, and a DR RAM may be used. Those are examples rather than limitative descriptions. It should be noted that the memory of the systems and methods described in this specification includes but is not limited to these and any memory of another proper type.

Figure 13:
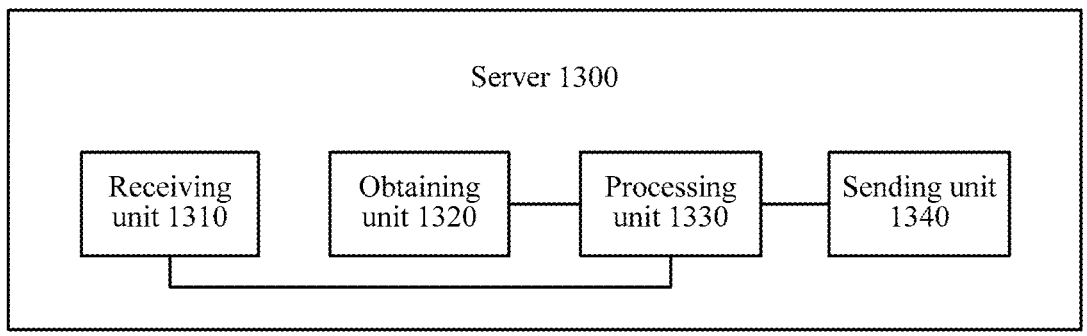
FIG. 13 is a schematic structural diagram of a server according to another embodiment of the present invention.

As shown in FIG. 13, FIG. 13 is a schematic structural diagram of a server 1300 according to an embodiment of the present invention. As shown in FIG. 13, the server 1300 includes a receiving unit 1310, an obtaining unit 1320, a processing unit 1330, and a sending unit 1340.

The receiving unit 1310 is configured to receive a running speed of a vehicle running on a road that is reported by an in-vehicle apparatus of the vehicle.

The obtaining unit 1320 is configured to obtain a traffic flow of the road.

The processing unit 1330 is configured to determine indication information according to the traffic flow of the road that is obtained by the obtaining unit and the running speed of the vehicle that is received by the receiving unit, where the indication information is used to instruct the vehicle to adjust the running speed.

The sending unit 1340 is configured to send the indication information determined by the processing unit 1330.

The indication information that is used to instruct the vehicle to adjust the running speed is determined according to the traffic flow of the road and the running speed of the vehicle, and the indication information is sent, so that the vehicle can adjust the running speed according to the indication information. In this way, the running speed of the vehicle can be dynamically planned and controlled according to the traffic flow.

Figure 14:
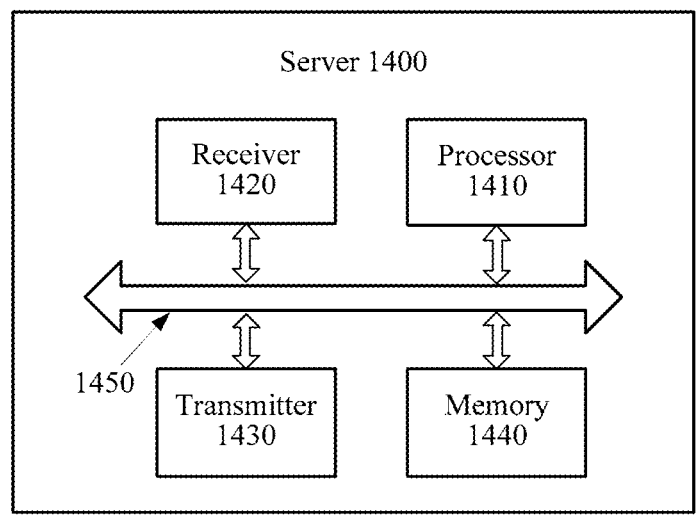
FIG. 14 is a schematic structural diagram of a server according to another embodiment of the present invention.

It should be noted that, the receiving unit 1310 may be implemented by a receiver, the sending unit 1340 may be implemented by a transmitter, and the obtaining unit 1320 and the processing unit 1330 may be implemented by a processor. As shown in FIG. 14, the server 1400 includes a processor 1410, a receiver 1420, a transmitter 1430, and a memory 1440. The memory 1440 may be configured to store a map, or may be configured to store code executed by the processor 1410, or the like. Components in the server 1400 are connected together by using a bus system 1450. The bus system 1450 further includes a power bus, a control bus, and a status signal bus in addition to a data bus.

It should be understood that the server 1300 shown in FIG. 13 or the server 1400 shown in FIG. 14 may correspond to the server in the traffic control method 800 according to the embodiments of the present invention, and the foregoing and other operations and/or functions of the modules/units in the server 1300 or the server 1400 are used to separately implement the corresponding procedures of the method 800 in FIG. 8. For brevity, details are not described herein.

It should be noted that the foregoing method embodiment of the present invention may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general purpose processor, a DSP, an ASIC, an FPGA, or another programmable logic component, a discrete gate or a transistor logic component, or a discrete hardware component. It may implement or perform the methods, the steps, and logical block diagrams that are disclosed in the embodiments of the present invention. The general purpose processor may be a microprocessor, or the processor may be any normal processor, or the like. Steps of the methods disclosed with reference to the embodiments of the present invention may be directly embodied as being implemented by a hardware decoding processor, or implemented by a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The non-volatile memory may be a ROM, a PROM, an EPROM, an EEPROM, or a flash memory. The volatile memory may be a RAM, and is used as an external cache. RAMs in many forms such as an SRAM, a DRAM, an SDRAM, a DDR SDRAM, an ESDRAM, an SLDRAM, and a DR RAM may be used. Those are examples rather than limitative descriptions. It should be noted that the memory of the systems and methods described in this specification includes but is not limited to these and any memory of another proper type.

Figure 15:
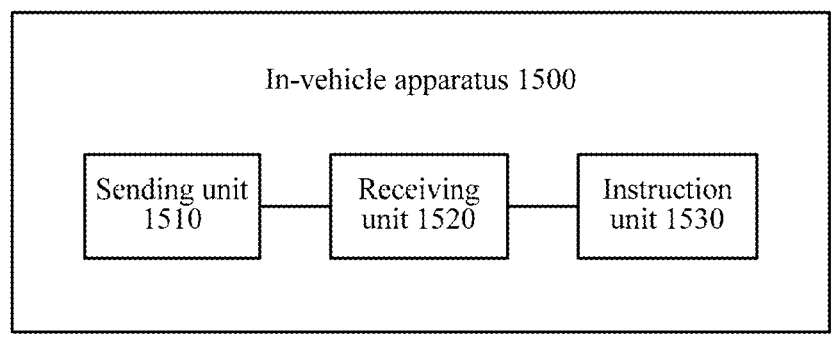
FIG. 15 is a schematic structural diagram of an in-vehicle apparatus according to another embodiment of the present invention.

As shown in FIG. 15, FIG. 15 is a schematic structural diagram of an in-vehicle apparatus 1500 according to an embodiment of the present invention. As shown in FIG. 15, the in-vehicle apparatus 1500 includes a sending unit 1510, a receiving unit 1520, and an instruction unit 1530.

The sending unit 1510 is configured to report a running speed of a vehicle on which the in-vehicle apparatus is located to a server.

The receiving unit 1520 is configured to receive indication information, where the indication information is determined by the server according to a traffic flow of a road on which the vehicle is located and the running speed.

The instruction unit 1530 is configured to instruct, according to the indication information received by the receiving unit 1520, the vehicle to adjust the running speed.

The vehicle is instructed, according to the indication information that is determined by the server according to the traffic flow of the road and the running speed of the vehicle, to adjust the running speed, so that the server can adjust and control the running speed of the vehicle according to the traffic flow of the road.

Figure 16:
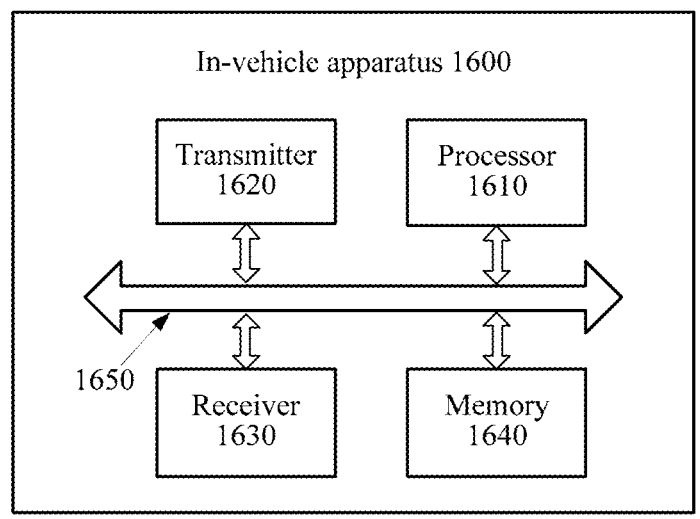
FIG. 16 is a schematic structural diagram of an in-vehicle apparatus according to another embodiment of the present invention.

It should be noted that, in this embodiment of the present invention, the sending unit 1510 may be implemented by a transmitter, the receiving unit 1520 may be implemented by a receiver, and the instruction unit 1530 may be implemented by a processor. As shown in FIG. 16, the in-vehicle apparatus 1600 includes a processor 1610, a transmitter 1620, a receiver 1630, and a memory 1640. The memory 1640 may be configured to store a map, or may be configured to store code executed by the processor 1610, or the like. Components of the in-vehicle apparatus 1600 are connected together by using a bus system 1650. The bus system 1650 further includes a power bus, a control bus, and a status signal bus in addition to a data bus.

It should be understood that the in-vehicle apparatus 1500 shown in FIG. 15 or the in-vehicle apparatus 1600 shown in FIG. 16 may correspond to the in-vehicle apparatus in the traffic control method 800 according to the embodiments of the present invention, and the foregoing and other operations and/or functions of the modules/units in the in-vehicle apparatus 1500 or the in-vehicle apparatus 1600 are used to separately implement the corresponding procedures of the method 800 in FIG. 8. For brevity, details are not described herein.

It should be noted that the foregoing method embodiment of the present invention may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general purpose processor, a DSP, an ASIC, an FPGA, or another programmable logic component, a discrete gate or a transistor logic component, or a discrete hardware component. It may implement or perform the methods, the steps, and logical block diagrams that are disclosed in the embodiments of the present invention. The general purpose processor may be a microprocessor, or the processor may be any normal processor, or the like. Steps of the methods disclosed with reference to the embodiments of the present invention may be directly embodied as being implemented by a hardware decoding processor, or implemented by a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The non-volatile memory may be a ROM, a PROM, an EPROM, an EEPROM, or a flash memory. The volatile memory may be a RAM, and is used as an external cache. RAMs in many forms such as an SRAM, a DRAM, an SDRAM, a DDR SDRAM, an ESDRAM, an SLDRAM, and a DR RAM may be used. Those are examples rather than limitative descriptions. It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer.

What is claimed is:

1. A method, comprising:
obtaining, by a server, a traffic flow of a road;
adjusting, by the server, a lane quantity or a lane width of the road at a lane layer on a map according to the traffic flow of the road; and
sending, by the server and to a vehicle driving on the road, the adjusted lane layer on the map, wherein the vehicle driving on the road changes a current running path according to a lane obtained from the adjusted lane layer;
wherein the method further comprising:
receiving, by the server, a running speed that is of a first vehicle running on the road and that is reported by a first in-vehicle apparatus; and
the adjusting, by the server, a lane quantity of the road at a lane layer according to the traffic flow of the road comprises:
when the traffic flow of the road decreases, a difference between the running speed of the first vehicle and a first preset speed is less than a preset threshold, and a quantity N of lanes on the road is greater than a first preset value $N_{min}$, redividing, by the server at the lane layer, the road into M lanes, wherein $N_{min} \leq M < N$.

2. The method according to claim 1, further comprising:
receiving, by the server, a location of the vehicle that is reported by an in-vehicle apparatus of the vehicle driving on the road;
replanning, by the server and according to the lane obtained from the adjusted lane layer and the location of the vehicle, a lane for the vehicle;
determining path change information; and
sending, by the server, the path change information to the in-vehicle apparatus, wherein the path change information is used to instruct the vehicle to run on the replanned lane.

3. The method according to claim 1, further comprising:
receiving, by the server, an identifier that is of a first vehicle driving on the road and that is reported by a first in-vehicle apparatus; and
determining, by the server, an attribute of the first vehicle according to the identifier of the first vehicle; and the adjusting, by the server, a lane width of the road at a lane layer according to the traffic flow of the road comprises:
when the attribute of the first vehicle satisfies a preset condition, increasing, by the server and at the lane layer, a width of a lane on which the first vehicle is located; and
decreasing a width of another lane on the road.

4. The method according to claim 1, wherein the adjusting, by the server, a lane quantity of the road at a lane layer according to the traffic flow of the road comprises:
when the traffic flow of the road increases, a quantity N of lanes on the road is less than a second preset value $N_{max}$, and a traffic flow of each of the N lanes on the road reaches a preset flow, redividing, by the server and at the lane layer, the road into M lanes, wherein $N < M \leq N_{max}$.

5. The method according to claim 4, further comprising:
receiving, by the server, a running speed that is of a second vehicle driving on the road and that is reported by a second in-vehicle apparatus; and
when the running speed of the second vehicle is less than a third preset speed, sending, by the server, indication information, wherein the indication information is used to instruct the second vehicle to increase the running speed to the third preset speed.

6. The method according to claim 4, further comprising:
receiving, by the server, a running speed that is of a second vehicle driving on the road and that is reported by a second in-vehicle apparatus;
obtaining, by the server, traffic density of a lane on which the second vehicle is located; and
when the traffic density of the lane on which the second vehicle is located is less than preset traffic density, and the running speed of the second vehicle is greater than a fourth preset speed, sending, by the server, indication information, wherein the indication information is used to instruct the second vehicle to decrease the running speed to the fourth preset speed and reduce a distance from the second vehicle to an adjacent vehicle ahead.

7. A method, comprising:
receiving, by an in-vehicle apparatus, a lane layer of a map that is sent by a server, wherein the lane layer is obtained by the server by adjusting a lane of a road at an original lane layer of the map according to a traffic flow of the road on which the in-vehicle apparatus is located;
updating, by the in-vehicle apparatus, the map according to the received lane layer; and
instructing, by the in-vehicle apparatus and according to the updated map, a vehicle on which the in-vehicle apparatus is located to change a current running path according to an adjusted lane of the updated map, wherein when the traffic flow of the road decreases, a difference between the running speed of the vehicle and a first preset speed is less than a preset threshold, and a quantity N of lanes on the road is greater than a first preset value $N_{min}$, the lane layer is further obtained by the server by redividing the road into M lanes at the original lane layer of the map, and wherein $N_{min} \leq M < N$.

8. The method according to claim 7, further comprising:
sending, by the in-vehicle apparatus, a location of the vehicle to the server; and
receiving, by the in-vehicle apparatus, path change information sent by the server, wherein the path change information is determined by the server according to the adjusted lane and the location of the vehicle; and the instructing, by the in-vehicle apparatus and according to the updated map, a vehicle on which the in-vehicle apparatus is located to run according to an adjusted lane comprises:
instructing, by the in-vehicle apparatus and according to the updated map and the path change information, the vehicle to run, according to the adjusted lane, on a target lane replanned by the server.

9. The method according to claim 7 further comprising:
reporting, by the in-vehicle apparatus, a running speed of the vehicle to the server;
receiving, by the in-vehicle apparatus, indication information that is sent by the server according to the running speed of the vehicle; and
instructing, by the in-vehicle apparatus and according to the indication information, the vehicle to adjust the running speed.

10. A server, comprising:
at least one receiver, the at least one receiver configured to obtain a traffic flow of a road;
at least one processor, the at least one processor configured to adjust a lane quantity or a lane width of the road at a lane layer on a map according to the traffic flow of the road; and
a transmitter, the transmitter configured to send the adjusted lane layer on the map, wherein a vehicle driving on the road changes a current running path according to a lane obtained from the adjusted lane layer, and wherein:
the at least one receiver includes a second receiver, the second receiver configured to receive a running speed that is of a first vehicle driving on the road and that is reported by a first in-vehicle apparatus; and
the at least one processor is configured to: when the traffic flow of the road decreases, a difference between the running speed of the first vehicle and a first preset speed is less than a preset threshold, and a quantity N of lanes on the road is greater than a first preset value $N_{min}$, redivide, at the lane layer, the road into M lanes, wherein $N_{min} \leq M < N$.

11. The server according to claim 10, wherein:
the at least one receiver includes a first receiver, the first receiver configured to receive a location of the vehicle that is reported by an in-vehicle apparatus of the vehicle driving on the road;
the at least one processor is further configured to replan, according to the lane obtained from the adjusted lane layer and the location of the vehicle, a lane for the vehicle; and
the transmitter is further configured to send path change information to the in-vehicle apparatus, wherein the path change information is used to instruct the vehicle to run on replanned lane.

12. The server according to claim 10, wherein:
the at least one receiver includes a second receiver, the second receiver configured to receive an identifier that is of a first vehicle driving on the road and that is reported by a first in-vehicle apparatus; and
the at least one processor is further configured to:
determine an attribute of the first vehicle according to the identifier of the first vehicle; and
when the attribute of the first vehicle satisfies a preset condition:
increase, at the lane layer, a width of a lane on which the first vehicle is located; and
decrease a width of another lane on the road.

13. The server according to claim 10, wherein the at least one processor is configured to: when the traffic flow of the road increases, a quantity N of lanes on the road is less than a second preset value $N_{max}$, and a traffic flow of each of the N lanes on the road reaches a preset flow, redivide, at the lane layer, the road into M lanes, wherein $N < M \leq N_{max}$.

14. The server according to claim 13, wherein:
the at least one receiver includes a third receiver, the third receiver configured to receive a running speed that is of a second vehicle driving on the road and that is reported by a second in-vehicle apparatus; and
the transmitter is further configured to: when the running speed of the second vehicle is less than a third preset speed, send, by the server, indication information, wherein the indication information is used to instruct the second vehicle to increase the running speed to the third preset speed.

15. The server according to claim 14, wherein:
the at least one receiver includes a third receiver, the third receiver configured to receive a running speed that is of a second vehicle driving on the road and that is reported by a second in-vehicle apparatus;
the at least one receiver is further configured to obtain traffic density of a lane on which the second vehicle is located; and
the transmitter is further configured to: when the traffic density of the lane on which the second vehicle is located is less than preset traffic density, and the running speed of the second vehicle is greater than a fourth preset speed, send indication information, wherein the indication information is used to instruct the second vehicle to decrease the running speed to the fourth preset speed and reduce a distance from the second vehicle to an adjacent vehicle ahead.

16. An in-vehicle apparatus, wherein the in-vehicle apparatus comprises:
a receiver, the receiver configured to receive a lane layer of a map that is sent by a server, wherein the lane layer is obtained by the server by adjusting a lane of a road at an original lane layer of the map according to a traffic flow of the road on which the in-vehicle apparatus is located; and
at least one processor, the at least one processor configured to:
update the map according to the received lane layer; and
instruct, according to the updated map, a vehicle on which the in-vehicle apparatus is located to change a current running path according to an adjusted lane of the updated map, wherein when the traffic flow of the road decreases, a difference between the running speed of the vehicle and a first preset speed is less than a preset threshold, and a quantity N of lanes on the road is greater than a first preset value $N_{min}$, the lane layer is further obtained by the server by redividing the road into M lanes at the original lane layer of the map, and wherein $N_{min} \leq M < N$.

17. The in-vehicle apparatus according to claim 16, further comprising:
a first transmitter, the first transmitter configured to send a location of the vehicle to the server, wherein:
the receiver is further configured to receive path change information sent by the server, wherein the path change information is determined by the server according to the adjusted lane and the location of the vehicle; and
the at least one processor is configured to instruct, by the in-vehicle apparatus and according to the updated map and the path change information, the vehicle to run, according to the adjusted lane, on a target lane replanned by the server.

18. The in-vehicle apparatus according to claim 17, further comprising:
a second transmitter, the second transmitter configured to report a running speed of the vehicle to the server, wherein:
the receiver is further configured to receive indication information that is sent by the server according to the running speed of the vehicle; and
the at least one processor is further configured to instruct, according to the indication information, the vehicle to adjust the running speed.

* * * * *